United States Patent
Chen et al.

(10) Patent No.: US 9,988,475 B2
(45) Date of Patent: *Jun. 5, 2018

(54) METHOD FOR PRODUCING ONE OR MORE ETHYLENE-BASED POLYMERS

(71) Applicant: Dow Global Technologies LLC, Midland, MI (US)

(72) Inventors: Linfeng Chen, Missouri City, TX (US); Robert J. Jorgensen, Fort Bragg, CA (US); Stephanie M. Whited, South Charleston, WV (US)

(73) Assignee: Dow Global Technologies LLC

( * ) Notice: Subject to any disclaimer, the term of this patent is extended or adjusted under 35 U.S.C. 154(b) by 154 days.

This patent is subject to a terminal disclaimer.

(21) Appl. No.: 14/902,128

(22) PCT Filed: Aug. 18, 2014

(86) PCT No.: PCT/US2014/051513
§ 371 (c)(1),
(2) Date: Dec. 30, 2015

(87) PCT Pub. No.: WO2015/026731
PCT Pub. Date: Feb. 26, 2015

(65) Prior Publication Data
US 2016/0369019 A1 Dec. 22, 2016

Related U.S. Application Data

(60) Provisional application No. 61/867,323, filed on Aug. 19, 2013.

(51) Int. Cl.
*C08F 2/38* (2006.01)
*C08F 4/12* (2006.01)
(Continued)

(52) U.S. Cl.
CPC ............................ *C08F 210/16* (2013.01)

(58) Field of Classification Search
CPC ........ C08F 210/16; C08F 4/6543; C08F 2/40; C08F 4/025; C08F 2/38; C08F 2/14
(Continued)

(56) References Cited

U.S. PATENT DOCUMENTS 4,302,565 A 11/1981 Goeke et al.
4,482,687 A 11/1984 Noshay et al.
(Continued)

OTHER PUBLICATIONS

PCT/US14/051513, International Preliminary Report on Patentability, dated Feb. 23, 2016.
(Continued)

*Primary Examiner* — William Cheung

(57) ABSTRACT

The instant invention provides a method for polymerizing one or more ethylene-based polymers. The method for polymerizing one or more ethylene-based polymers according to the present invention comprises the following steps: (1) selecting ethylene and optionally one or more alpha-olefin comonomers; (2) selecting one or more catalyst systems comprising one or more procatalysts comprising Ti, one or more cocatalysts comprising Al, and one or more self-limiting agents (SLA); wherein the ratio of SLA to Ti is from 5:1 to 40:1 and the ratio of Al to SLA is from 2:1 to 40:1; (3) polymerizing said ethylene and optionally one or more alpha-olefin comonomers in the presence of said one or more catalyst systems via a slurry polymerization process or gas-phase polymerization process in one or more reactors; (4) thereby producing one or more ethylene; wherein said catalyst system has a loss of least 85% of catalyst productivity when the temperature is increased from 85 to 115 C.

4 Claims, 2 Drawing Sheets

(51) Int. Cl.
*C08F 26/00* (2006.01)
*C08F 210/16* (2006.01)

(58) Field of Classification Search
USPC .................. 526/82, 83, 84, 85, 226, 248
See application file for complete search history.

(56) References Cited

U.S. PATENT DOCUMENTS

| | | | |
|---|---|---|---|
| 4,508,842 | A | 4/1985 | Beran et al. |
| 4,990,479 | A | 2/1991 | Ishimaru et al. |
| 5,122,494 | A | 6/1992 | Job |
| 5,290,745 | A | 3/1994 | Jorgensen et al. |
| 6,187,866 | B1 | 2/2001 | Jorgensen et al. |
| 7,381,779 | B2 | 6/2008 | Campbell, Jr. et al. |
| 7,393,910 | B2 | 7/2008 | Campbell, Jr. et al. |
| 7,491,670 | B2 | 2/2009 | Chen et al. |
| 7,678,867 | B2 * | 3/2010 | Baita ............... C08F 10/00 525/240 |
| 7,678,868 | B2 | 3/2010 | Chen et al. |
| 8,993,692 | B2 * | 3/2015 | Jorgensen ......... C08F 210/16 526/110 |
| 2004/0026639 | A1 | 2/2004 | Mathews et al. |
| 2004/0026642 | A1 | 2/2004 | Maercovich et al. |
| 2004/0026836 | A1 | 2/2004 | Brookes |
| 2004/0030496 | A1 | 2/2004 | Brodie |
| 2008/0073678 | A1 | 3/2008 | Kim |
| 2008/0086551 | A1 | 4/2008 | Moy |
| 2009/0042244 | A1 | 2/2009 | Voloshin et al. |
| 2009/0069140 | A1 | 3/2009 | Hockl |
| 2011/0152067 | A1 | 6/2011 | Chen et al. |

OTHER PUBLICATIONS

PCT/US14/0515137 International Search Report & Written Opinion of the International Searching Authority, dated Nov. 3, 2014.
Dow Global Technologies, Inc., EP Appln. No. 06814361.9-1211, Rejection dated Nov. 14, 2008.
Dow Global Technologies, Inc., EP Appln. No. 06814361.9-1211, Response dated May 22, 2009.
Dow Global Technologies, Inc., EP Appln. No. 06814361.9-1211, Second Rejection dated Feb. 19, 2010.
Dow Global Technologies, Inc., EP Appln. No. 06814361.9-1211, Response dated Aug. 12, 2010.

* cited by examiner

METHOD FOR PRODUCING ONE OR MORE ETHYLENE-BASED POLYMERS

This application is the National Stage application under 35 U.S.C. 371 of PCT International Application No. PCT/US2014/051513 filed Aug. 18, 2014, which claims priority from Provisional patent application Ser. No. 61/867,323 filed Aug. 19, 2013, the contents of which are hereby incorporated by reference in their entirety.

FIELD OF INVENTION

The instant invention relates to a method for producing one or more ethylene-based polymers.

BACKGROUND OF THE INVENTION

Ethylene (co)polymerization typically operates at a temperature that is close to the softening temperature of the resultant (co)polymer. Insufficient heat removal can easily lead to temperature exceeding the softening temperature and cause (co)polymer agglomeration that may disrupt production continuity.

In a gas phase polymerization process, the polymerization reactor is cooled by the circulating monomer gasses to maintain a steady operating temperature. However, if the temperature of a growing resin particle approaches the sticking/melting point of the resin, resin sheeting on the reactor walls may occur. Growing resin particles are especially susceptible to overheating if they accumulate at the reactor walls, thereby losing heat-transfer with the circulating monomer gasses, and remaining in close contact with respect to each other. In such instances, particle-particle fusion may occur, followed by reactor sheeting, which, in turn, could cause reactor shutdown.

Catalyst systems to minimize or prevent reactor sheeting have been developed for use in propylene polymerization reactions. Such catalyst systems possess mitigating chemical features, which reduce polymerization rate when the temperature becomes excessive. A known system uses two or more reagents external to the catalyst composition, one or more Selectivity Control Agent (SCA), or one or more Activity Limiting Agent (ALA), or one or more Self-limiting Agents (SLA), to slow or deactivate the polymerization reaction. The combination of SCAs and SLAs have been used successfully in propylene polymerization and co-polymerization reactions; for example, the mixtures described U.S. Pat. Nos. 7,678,868, 7,381,779, 7,491,670, and US20110152067. The operating temperature for PP polymerization is 65 to 80° C., and the melting point of the resin is about 165° C., giving an 85 to 100° C. temperature span in which an SLA may operate. Generally, polypropylene SLAs substantially shut down the polymerization active site when the temperature of the active site reaches about 90° C. Such polypropylene catalysts may contain an ester or diether compounds as internal donor, which can further suppress catalyst activities at elevated temperatures.

SLAs or the combination of SLAs and SCAs, however, have not previously been used successfully in ethylene polymerization or copolymerization reactions in commercial scales. For a PE process, the polymerization temperatures are about 80 to 112° C., while the melting point of the PE resin produced is about 115 to 135° C. and the sticking temperature, i.e. the temperature at which granular particles begin to adhere to each other, is about 100 to 125° C. Thus, for such PE polymerization reactions, there is only a 15 to 25° C. temperature span in which SLAs may function.

The currently available catalyst systems fail to address such heat removal concerns in PE polymerization systems. Therefore, there is a need for a catalyst system having an effective mechanism that substantially reduces catalyst activity within a narrow temperature range and therefore reducing heat generation when the temperature in various parts of the reactor system approaches (co)polymer softening temperature to prevent agglomeration formation and minimizing production disruptions.

SUMMARY OF THE INVENTION

The instant invention provides a method for polymerizing one or more ethylene-based polymers.

In one embodiment, the instant invention provides a method for polymerizing one or more ethylene-based polymers comprising the steps of: (1) selecting ethylene and optionally one or more alpha-olefin comonomers; (2) selecting one or more catalyst systems comprising one or more procatalysts comprising Ti, one or more cocatalysts comprising Al, and one or more self-limiting agents (SLA); wherein the ratio of SLA to Ti is from 5:1 to 40:1 and the ratio of Al to SLA is from 2:1 to 40:1; (3) polymerizing said ethylene and optionally one or more alpha-olefin comonomers in the presence of said one or more catalyst systems via a slurry polymerization process or gas-phase polymerization process in one or more reactors; (4) thereby producing one or more ethylene-based polymers; wherein said catalyst system has a loss of at least 85% of catalyst productivity when the temperature is increased from 85 to 115° C.

In an alternative embodiment, the instant invention further provides a method for polymerizing one or more ethylene-based polymers comprising the steps of: (1) selecting ethylene and optionally one or more alpha-olefin comonomers; (2) selecting one or more catalyst systems comprising one or more procatalysts comprising Ti, one or more cocatalysts comprising Al, and one or more self-limiting agents (SLA); wherein the ratio of SLA to Ti is from 15:1 to 40:1 and the ratio of Al to SLA is from 5:1 to 20:1; (3) polymerizing said ethylene and optionally one or more alpha-olefin comonomers in the presence of said one or more catalyst systems via a slurry polymerization process or gas-phase polymerization process in one or more reactors; (4) thereby producing one or more ethylene-based polymers; wherein said catalyst system has a loss of at least 80% of catalyst productivity when the temperature is increased from 95 to 110° C.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
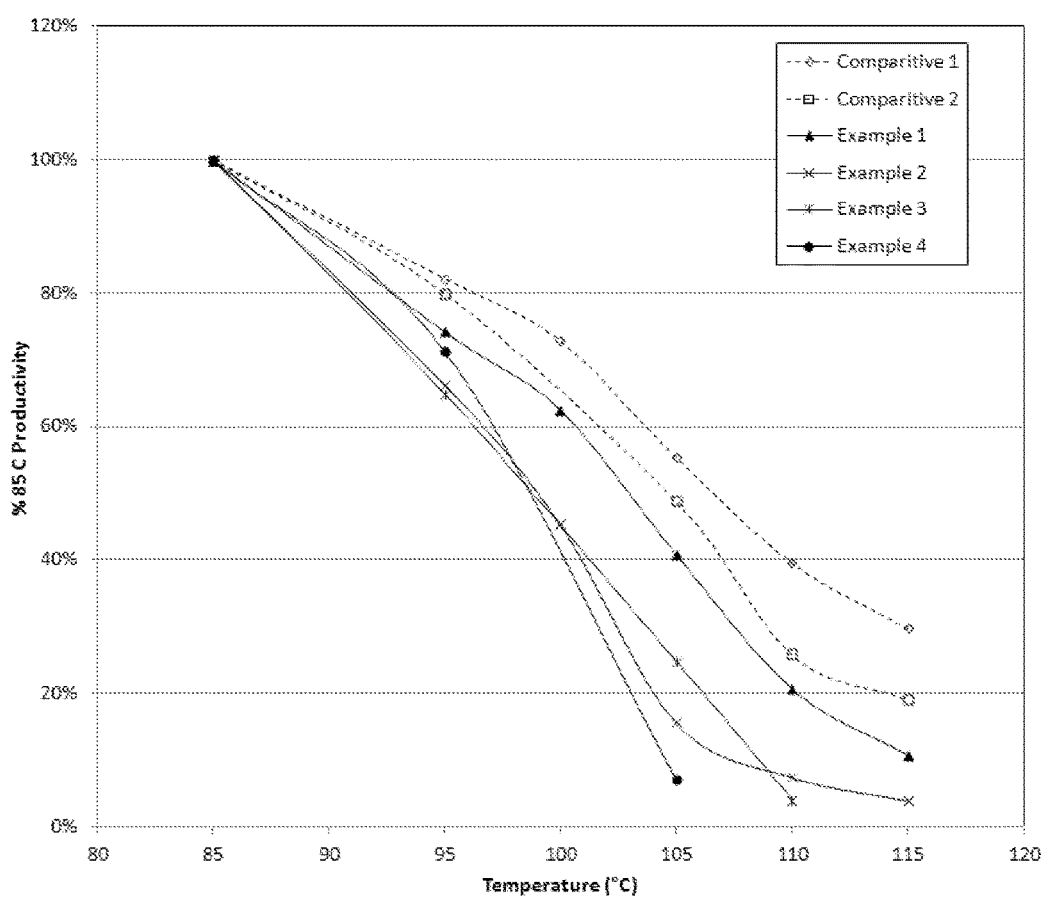
FIG. 1 is a graph illustrating the relationship between the increase in reaction temperature from 85° C. to 115° C. and relative catalyst productivity.

The instant invention provides a method for polymerizing one or more ethylene-based polymers.

In one embodiment, the instant invention provides a method for polymerizing one or more ethylene-based polymers comprising the steps of: (1) selecting ethylene and optionally one or more alpha-olefin comonomers; (2) selecting one or more catalyst systems comprising one or more procatalysts comprising Ti, one or more cocatalysts comprising Al, and one or more self-limiting agents (SLA); wherein the ratio of SLA to Ti is from 5:1 to 40:1 and the ratio of Al to SLA is from 2:1 to 40:1; (3) polymerizing said ethylene and optionally one or more alpha-olefin comonomers in the presence of said one or more catalyst systems via a slurry polymerization process or gas-phase polymerization process in one or more reactors; (4) thereby producing one or more ethylene-based polymers; wherein said catalyst system has a loss of at least 85% of catalyst productivity when the reaction temperature is increased from 85 to 115° C.

In an alternative embodiment, the instant invention further provides a method for polymerizing one or more ethylene-based polymers comprising the steps of: (1) selecting ethylene and optionally one or more alpha-olefin comonomers; (2) selecting one or more catalyst systems comprising one or more procatalysts comprising Ti, one or more cocatalysts comprising Al, and one or more self-limiting agents (SLA); wherein the ratio of SLA to Ti is from 15:1 to 40:1 and the ratio of Al to SLA is from 5:1 to 20:1; (3) polymerizing said ethylene and optionally one or more alpha-olefin comonomers in the presence of said one or more catalyst systems via a slurry polymerization process or gas-phase polymerization process in one or more reactors; (4) thereby producing one or more ethylene-based polymers; wherein said catalyst system has a loss of at least 80% of catalyst productivity when the reaction temperature is increased from 95 to 110° C.

One aspect of the invention provides a method of minimizing or eliminating reactor sheeting in a two-stage polyethylene polymerization which produces a polyethylene having a high molecular weight fraction, the method comprising introducing one or more self-limiting agents, according to the present invention.

Another aspect of the invention provides a method of minimizing or eliminating reactor sheeting in single stage polyethylene polymerizations which produces a polyethylene, the method comprising introducing one or more self-limiting agents, according to the present invention.

Embodiments of the invention provide methods utilizing self-limiting agents that will cause a loss of at least 70% of catalyst productivity when the reaction temperature is increased from 95 to 110° C. In a further embodiment, the invention provides methods utilizing self-limiting agents that will cause a loss of at least 80% of catalyst productivity when the reaction temperature is increased from 95 to 110° C. In another embodiment, the invention provides methods utilizing self-limiting agents that will cause a loss of at least 90% of catalyst productivity when the reaction temperature is increased from 95 to 110° C.

Embodiments of the invention provide methods utilizing self-limiting agents that will cause a loss of at least 85% of catalyst productivity when the reaction temperature is increased from 85 to 115° C. In a further embodiment, the invention provides methods utilizing self-limiting agents that will cause a loss of at least 90% of catalyst productivity when the reaction temperature is increased from 85 to 115° C.

Embodiments of the invention provide methods utilizing self-limiting agents that will cause a loss of at least 35% of catalyst productivity when the reaction temperature is increased from 85 to 100° C. In a further embodiment, the invention provides methods utilizing self-limiting agents that will cause a loss of at least 50% of catalyst productivity when the reaction temperature is increased from 85 to 100° C. Embodiments of the invention provide methods utilizing self-limiting agents that will cause a loss of at least 55%, or at least 70%, or at least 80%, or at least 90% of catalyst productivity when the reaction temperature is increased from 85 to 105° C.

Embodiments of the invention provide methods utilizing self-limiting agents that will cause a loss of at least 75%, or at least 80%, or at least 90% of catalyst productivity when the reaction temperature is increased from 85 to 110° C.

Embodiments of the invention provide methods utilizing self-limiting agents that will cause a loss of at least 80% or at least 90% of catalyst productivity when the reaction temperature is increased from 95 to 115° C.

Another aspect of the invention utilizes self-limiting agents which, while minimizing or eliminating reactor wall sheeting, do not negatively impact the physical properties of the PE resin in comparison to those of PE resins produced in the absence of the self-limiting agent.

In some aspects of the invention, the self-limiting agent is mixed with a cocatalyst feed and introduced into the reactor. In alternative embodiments of the invention, the self-limiting agent is introduced into the reactor separately from the cocatalyst feed.

In some embodiments of the invention, the self-limiting agent is isopropyl myristate. In one embodiment, the self-limiting agent is dissolved in a solvent, for example, isopentane.

In some embodiments of the invention, the self-limiting agent is selected from the group of isopropyl laurate, isopropyl myristate, isopropyl palmitate, and isopropyl stearate.

Within the scope of the present application, the term "procatalyst" or "precursor", used interchangeably herein, denotes a compound comprising a ligand, a transition metal, and optionally an electron donor. The procatalyst may further undergo halogenation by contacting with one or more halogenating agents. A procatalyst can be converted into a catalyst upon activation. Such catalysts are commonly referred to as Ziegler-Natta catalysts. Suitable Zeigler-Natta catalysts are known in the art and include, for example, the catalysts taught in U.S. Pat. Nos. 4,302,565; 4,482,687; 4,508,842; 4,990,479; 5,122,494; 5,290,745; and, 6,187,866 B1, the disclosures of which are hereby incorporated by reference. The collection of catalyst components, such as procatalyst(s), cocatalyst(s), and optionally self-limiting agent(s), is referred to as a catalyst system.

The transition metal compound of the procatalyst composition can comprise compounds of different kinds. The most usual are titanium compounds—organic or inorganic—having an oxidation degree of 3 or 4. Other transition metals such as, vanadium, zirconium, hafnium, chromium, molybdenum, cobalt, nickel, tungsten and many rare earth metals are also suitable for use in Ziegler-Natta catalysts. The transition metal compound is usually a halide or oxyhalide, an organic metal halide or purely a metal organic compound. In the last-mentioned compounds, there are only organic ligands attached to the transition metal.

The procatalyst can have the formula $Mg_d Me(OR)_e X_f (ED)_g$ wherein R is an aliphatic or aromatic hydrocarbon radical having 1 to 14 carbon atoms or COW wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is >1 to 1.5(d). Me is a transition metal selected from the group of titanium, zirconium, hafnium and vanadium. Some specific examples of suitable titanium compounds are: $TiCl_3$, $TiCl_4$, $Ti(OC_2H_5)_2Br_2$, $Ti(OC_6H_5)Cl_3$, $Ti(OCOCH_3)Cl_3$, $Ti(acetylacetonate)_2Cl_2$, $TiCl_3(acetylacetonate)$, and $TiBr_4$. $TiCl_3$ and $TiCl_4$ are preferred titanium compounds.

The magnesium compounds include magnesium halides such as $MgCl_2$, $MgBr_2$, and $MgI_2$. Anhydrous $MgCl_2$ is a preferred compound. Other compounds useful in the invention are $Mg(OR)_2$, $Mg(OCO_2Et)$ and MgRCl where R is defined above. About 0.5 to about 56, and preferably about 1 to about 20, moles of the magnesium compounds are used per mole of transition metal compound. Mixtures of these compounds may also be used.

The procatalyst compound can be recovered as a solid using techniques known in the art, such as precipitation of the procatalyst or by spray drying, with or without fillers. Spray drying is a particularly preferred method for recovery of the procatalyst compound.

Spray drying is taught in U.S. Pat. No. 5,290,745 and is incorporated by reference. A further procatalyst comprising magnesium halide or alkoxide, a transition metal halide, alkoxide or mixed ligand transition metal compound, an electron donor and optionally a filler can be prepared by spray drying a solution of said compounds from an electron donor solvent.

The electron donor is typically an organic Lewis base, liquid at temperatures in the range of about 0° C. to about 200° C., in which the magnesium and transition metal compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl mono-ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. Mono-ether is defined herein as a compound that contains only one ether functional group in the molecule. For ethylene homo and co-polymerization, the most preferred electron donor is tetrahydrofuran. Other examples of suitable electron donors are methyl formate, ethyl acetate, butyl acetate, ethyl ether, dioxane, di-n-propyl ether, dibutyl ether, ethanol, 1-butanol, ethyl formate, methyl acetate, ethyl anisate, ethylene carbonate, tetrahydropyran, and ethyl propionate.

While an excess of electron donor may be used initially to provide the reaction product of transition metal compound and electron donor, the reaction product finally contains about 1 to about 20 moles of electron donor per mole of transition metal compound and preferably about 1 to about 10 moles of electron donor per mole of transition metal compound.

The ligands comprise halogen, alkoxide, aryloxide, acetylacetonate and amide anions.

Partial activation of the procatalyst can be carried out prior to the introduction of the procatalyst into the reactor. The partially activated catalyst alone can function as a polymerization catalyst but at greatly reduced and commercially unsuitable catalyst productivity. Complete activation by additional cocatalyst is required to achieve full activity. The complete activation occurs in the polymerization reactor via addition of cocatalyst.

The catalyst procatalyst can be used as dry powder or slurry in an inert liquid. The inert liquid is typically a mineral oil. The slurry prepared from the catalyst and the inert liquid has a viscosity measured at 1 $sec^{-1}$ of at least 500 cp at 20° C. Examples of suitable mineral oils are the Kaydol and Hydrobrite mineral oils from Crompton.

In one embodiment in a polymerization process, the procatalyst undergo in-line reduction using reducing agent(s). The procatalyst is introduced into a slurry feed tank; the slurry then passes via a pump to a first reaction zone immediately downstream of a reagent injection port where the slurry is mixed with the first reagent, as described below. Optionally, the mixture then passes to a second reaction zone immediately downstream of a second reagent injection port where it is mixed with the second reagent (as described below) in a second reaction zone. While only two reagent injection and reaction zones are described above, additional reagent injection zones and reaction zones may be included, depending on the number of steps required to fully activate and modify the catalyst to allow control of the specified fractions of the polymer molecular weight distribution. Means to control the temperature of the catalyst procatalyst feed tank and the individual mixing and reaction zones are provided.

Depending on the activator compound used, some reaction time may be required for the reaction of the activator compound with the catalyst procatalyst. This is conveniently done using a residence time zone, which can consist either of an additional length of slurry feed pipe or an essentially plug flow holding vessel. A residence time zone can be used for both activator compounds, for only one or for neither, depending entirely on the rate of reaction between activator compound and catalyst procatalyst.

Exemplary in-line reducing agents are aluminum alkyls and aluminum alkyl chlorides of the formula $AlR_xCl_y$ where X+Y=3 and y is 0 to 2 and R is a C1 to C14 alkyl or aryl radical. Such in-line reducing agents include those listed in the following table:

| Reducing Agents | Reducing Agents |
|---|---|
| Diethylaluminum chloride | Triethylaluminum |
| Ethylaluminum dichloride | Trimethylaluminum |
| di-isobutyaluminum chloride | Triisobutylaluminum |
| dimethylaluminum chloride | Tri-n-hexylaluminum |
| Methylaluminum sesquichloride | Tri-n-octylaluminum |
| Ethylaluminum sesquichloride | Dimethylaluminum chloride |

The entire mixture is then introduced into the reactor where the activation is completed by the cocatalyst. Additional reactors may be sequenced with the first reactor, however, catalyst is typically only injected into the first of these linked, sequenced reactors with active catalyst transferred from a first reactor into subsequent reactors as part of the polymer thus produced.

The cocatalysts, which are reducing agents, conventionally used are comprised of aluminum compounds, but compounds of lithium, sodium and potassium, alkaline earth metals as well as compounds of other earth metals than aluminum are possible. The compounds are usually hydrides, organometal or halide compounds. Conventionally, the cocatalysts are selected from the group comprising Al-trialkyls, Al-alkyl halides, Al-alkyl alkoxides and Al-alkyl alkoxy halides. In particular, Al-alkyls and Al-alkyl chlorides are used. These compounds are exemplified by trimethylaluminum, triethylaluminum, tri-isobutylaluminum, tri-n-hexylaluminum, dimethylaluminum chloride, diethylaluminum chloride, ethylaluminum dichloride and diisobutylaluminum chloride, isobutylaluminum dichloride and the like. Butyllithium and dibutylmagnesium are examples of useful compounds of other metals.

Optionally, the slurry may be diluted prior to entering reactor. The diluent can be a mineral oil or an aliphatic hydrocarbon and may be added with the cocatalyst or directly to the reaction zone following the cocatalyst addition.

Ultimately, the activated catalyst is fed into a gas phase reactor in which an olefin polymerization reaction is in progress.

In some aspects of the invention, the self-limiting agent is mixed with and introduced into the reactor with a cocatalyst feed. In alternative embodiments of the invention, the self-limiting agent is introduced into the reactor separately from the cocatalyst feed to the reactor.

The self-limiting agents are comprised of $C_1$-$C_{20}$ alkyl esters of $C_4$-$C_{30}$ aliphatic acids. Exemplary self-limiting agents are isopropyl esters of $C_8$-$C_{20}$ aliphatic acids. In the alternative, exemplary self-limiting agents are the aliphatic acid esters of low odor and low toxicity. The aliphatic carboxylic acid ester may be a mono- or a poly- (two or more) ester, may be straight chain or branched, may be saturated or unsaturated, and any combination thereof. The $C_4$-$C_{30}$ aliphatic acid ester may also be substituted with one or more Group 14, 15 or 16 heteroatom containing substituents. Non-limiting examples of suitable $C_4$-$C_{30}$ aliphatic acid esters include $C_1$-$C_{20}$ alkyl esters of aliphatic $C_{4-30}$ monocarboxylic acids, $C_{1-20}$ alkyl esters of aliphatic $C_8$-$C_{20}$ monocarboxylic acids, $C_1$-$C_4$ alkyl mono- and diesters of aliphatic $C_4$-$C_{20}$ monocarboxylic acids and dicarboxylic acids, and $C_1$-$C_4$ alkyl esters of aliphatic $C_8$-$C_{20}$ monocarboxylic acids and dicarboxylic acids. In a further embodiment, the $C_4$-$C_{30}$ aliphatic acid ester may be a laurate, a myristate, a palmitate, a stearate, an oleate, and mixtures thereof. In a further embodiment, the $C_4$-$C_{30}$ aliphatic ester is isopropyl laurate, isopropyl myristate, isopropyl palmitate, or isopropyl stearate.

The self-limiting property of a catalyst system that comprises SLA(s) depends on the amount of SLA, i.e., SLA/Ti ratio. However, a high SLA/Ti ratio has a negative impact on catalyst productivity, thus limiting the application of a very high SLA/Ti ratio in a commercial production setting. The inventors unexpectedly discovered an additional way to enhance the self-limiting property by increasing Al/SLA ratio, in contrast to the SLAs used in propylene polymerization whereas a lower Al/SLA ratio led to improved self-limiting property. In some embodiments, the SLA/Ti ratio may be 5/1 to 100/1, or 5/1 to 40/1, or 10/1 to 40/1, or 10/1 to 30/1, or 10/1 to 25/1, or 15/1 to 40/1, or 15/1 to 30/1, or 15/1 to 25/1.

In other embodiments, The Al/SLA ratio may be 1/1 to 100/1, or 2/1 to 40/1, or 3/1 to 30/1, or 4/1 to 20/1, or 5/1 to 15/1, or 6/1 to 12/1, or 7/1 to 10/1.

Examples

The following examples illustrate the present invention but are not intended to limit the scope of the invention. The examples of the instant invention demonstrate that the use of self-limiting agents according to the present invention reduces catalyst activity at relatively higher temperature, i.e. temperatures near the softening temperature of the polymer, and as a result it reduces potential reactor sheeting.

Preparation of Catalyst Procatalyst

A titanium trichloride catalyst procatalyst is prepared in an approximately 7,500 liter glass lined vessel equipped with pressure and temperature control, and a turbine agitator.

A nitrogen atmosphere (<5 ppm $H_2O$) is maintained at all times. Tetrahydrofuran (10,500 lbs, 4,800 kg, <400 ppm $H_2O$) are added to the vessel. The tetrahydrofuran (THF) is recovered from a closed cycle dryer and contained approximately 0.1 percent Mg and 0.3 percent Ti. An 11 percent THF solution of triethylaluminum is added to scavenge residual water. The reactor contents are heated to 40° C., and 13.7 lbs (6 kg) of granular magnesium metal (particle size 0.1-4 mm) is added, followed by 214.5 lbs (97.3 kg) of titanium tetrachloride added over a period of one-half hour.

The mixture is continuously agitated. The exotherm resulting from the addition of titanium tetrachloride causes the temperature of the mixture to rise to approximately 44° C. The temperature is then raised to 70° C. and held at that temperature for approximately four hours, then cooled to 50° C. At the end of this time, 522 pounds (238 kg) of magnesium dichloride are added and heating initiated to raise the temperature to 70° C. The mixture is held at this temperature for another five hours, then cooled to 35° C. and filtered through a 100 mesh (150 µm) filter to remove solids.

Fumed silica (CAB-O-SIL™ TS-610, manufactured by the Cabot Corporation) (811 lbs, 368 kg) is added to the above procatalyst solution over a period of one hour. The mixture is stirred by means of a turbine agitator during this time and for 4 hours thereafter to thoroughly disperse the silica. The temperature of the mixture is held at 40° C. throughout this period and a dry nitrogen atmosphere is maintained at all times. The resulting slurry is spray dried using an 8-foot diameter closed cycle spray dryer equipped with a rotary atomizer. The rotary atomizer is adjusted to give catalyst particles with a D50 on the order of 20-30 µm. The scrubber section of the spray dryer is maintained at approximately +5 to −5° C.

Nitrogen gas is introduced into the spray dryer at an inlet temperature of 140 to 165° C. and is circulated at a rate of approximately 1000-1800 kg/hour. The catalyst slurry is fed to the spray dryer at a temperature of about 35° C. and a rate of 65-150 kg/hour, or sufficient to yield an outlet gas temperature in the range of 100-125° C. The atomization pressure is maintained at slightly above atmospheric. The resulting catalyst particles are mixed with mineral oil under a nitrogen atmosphere in a 400 liter glass lined vessel equipped with a turbine agitator to form a slurry containing approximately 28 percent of the catalyst procatalyst.

Catalyst Procatalyst Partial Pre-Activation

The mineral oil slurry of procatalyst is partially activated by contact at room temperature with an appropriate amount of a 40 percent mineral oil solution of tri-n-hexylaluminum (TNHA). The catalyst procatalyst slurry is added to a mixing vessel. While stirring a 40 percent mineral oil solution of tri-n-hexylaluminum (TNHA) was added at ratio of 0.17 moles of TNHA to mole of residual THF in the procatalyst and stirred for at least 1 hour prior to use.

Polymerization Process for Preparing the Polyethylene Composition

The inventive and comparative polyethylene compositions, ethylene/1-hexene copolymers, were produced in accordance with the following general procedure. The catalyst composition was prepared according to the process described above, and partially pre-activated. The catalyst composition was injected as a slurry into a fluidized bed gas phase polymerization reactor. Triethylaluminum (TEAL) co-catalyst was fed to the fluid bed reactor as a 2.5 wt % solution in isopentane. When SLA was used, isopropyl myristate was fed to the fluid bed reactor as a 2 wt % solution in isopentane.

Figure 2:
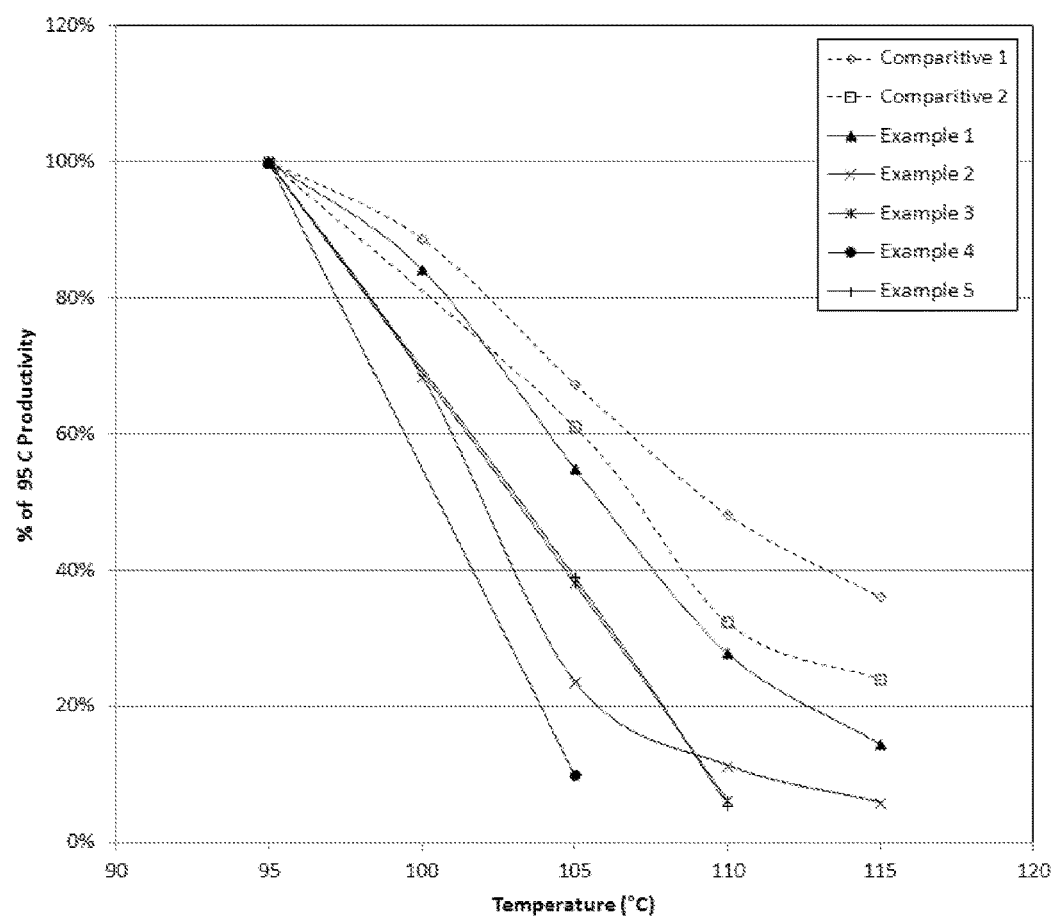
FIG. 2 is a graph illustrating the relationship between the increase in reaction temperature from 95° C. to 115° C. and relative catalyst productivity.

The polymerization was conducted in a 13.25 inch ID diameter gas-phase fluidized bed reactor operating at approximately 350 psig total pressure, ethylene partial pressure of 120 psi, H$_2$/C$_2$ molar ratio of approximately 0.33, and C$_6$/C$_2$ molar ratio of approximately 0.016. The reactor bed weight was approximately 100 pounds. Ethylene, hydrogen, 1-hexene and nitrogen were fed to the cycle gas loop just upstream of the compressor at quantities sufficient to maintain the desired gas concentrations. Product polyethylene was withdrawn from the reactor in batch mode. The polymerization process was conducted according to the process conditions reported in Table I. The catalyst productivity for each polymerization process was measured and reported in Table 1 and FIGS. 1-2.

The catalyst feed rate was kept constant within each example through the changes in temperature. The catalyst residuals (indicated by residual Ti) were measured by X-ray, and reported in Table 1. The average of these values for each example was used to determine the hourly Ti feed rate and calculate the Ti productivity, and reported in Table 1. The steady state residual Ti of some of the lower productivity points (indicated by * next to those values reported in Table 1) was calculated based on the average Ti feed rate determined from the 85 and 95° C. points for that example. The Ti productivity was normalized for differences in residence time based on the following relationship:

$$\text{Normalized } Ti \text{ Productivity}_1 = Ti \text{ productivity}_1 * \frac{\tau_0 * (1 + 0.36 * \tau_1)}{\tau_1 * (1 + 0.36 * \tau_0)}$$

Where
$\tau_0$ = Residence time of reference (hours)
$\tau_1$ = Residence time (hours)
Ti productivity$_1$ = lbs resin/lbs Ti from catalyst feed Titanium residuals were measured as ppm by wt using X-ray Diffraction techniques with appropriate standards.

TABLE 1

| | Reactor Temperature (° C.) | 2.5 wt % TEAL Feed | 2.0 wt % SLA feed | Al/Ti (molar) | SLA/Ti (molar) | Al/SLA (molar) | Production Rate (lb/hr) | Residual Ti (ppmw) | Residence Time (hr) | lb/hr Ti from catalyst (calculated) | Ti Productivity (lb/lb) | Normalized Ti productivity (lb/lb) | %85 C | %95 C |
|---|---|---|---|---|---|---|---|---|---|---|---|---|---|---|
| Comparative Example 1 | 85 | 98 | 0 | 38 | 0 | — | 37.0 | 1.00 | 2.7 | 0.0000370 | 1000000 | 1000000 | 100% | |
| | 95 | 96 | 0 | 37 | 0 | — | 33.0 | 1.15 | 3.0 | 0.0000380 | 869565 | 821918 | 82% | 100% |
| | 100 | 100 | 0 | 45 | 0 | — | 27.3 | 1.19 | 3.7 | 0.0000325 | 840336 | 728675 | 73% | 89% |
| | 105 | 99 | 0 | 41 | 0 | — | 23.4 | 1.47 | 4.3 | 0.0000344 | 680272 | 553536 | 55% | 67% |
| | 110 | 99 | 0 | 41 | 0 | — | 18.3 | 1.88 | 5.5 | 0.0000344 | 531915 | 395657 | 40% | 48% |
| | 115 | 98 | 0 | 41 | 0 | — | 14.7 | 2.34 | 6.8 | 0.0000344 | 427350 | 296804 | 30% | 36% |
| Inventive Example 1 | 85 | 200 | 75 | 77 | 9.8 | 7.86 | 30.1 | 1.24 | 3.3 | 0.0000373 | 806452 | 730225 | 100% | |
| | 95 | 199 | 75 | 74 | 9.3 | 7.88 | 25.3 | 1.55 | 4.0 | 0.0000392 | 645161 | 541759 | 74% | 100% |
| | 100 | 198 | 76 | 84 | 10.8 | 7.74 | 20.3 | 1.69 | 4.9 | 0.0000343 | 591716 | 456351 | 62% | 84% |
| | 105 | 202 | 76 | 76 | 9.7 | 7.85 | 16.0 | 2.39* | 6.3 | 0.0000383 | 418088 | 297816 | 41% | 55% |
| | 110 | 202 | 76 | 76 | 9.7 | 7.84 | 9.3 | 4.12* | 10.8 | 0.0000383 | 243013 | 150801 | 21% | 28% |
| | 115 | 200 | 76 | 76 | 9.7 | 7.77 | 5.3 | 7.22* | 18.9 | 0.0000383 | 138491 | 78352 | 11% | 14% |
| Inventive Example 2 | 85 | 297 | 152 | 122 | 20.9 | 5.82 | 23.9 | 1.48 | 4.2 | 0.0000354 | 675676 | 554424 | 100% | |
| | 95 | 306 | 152 | 120 | 20.2 | 5.96 | 18.2 | 2.02 | 5.5 | 0.0000368 | 495050 | 367557 | 66% | 100% |
| | 100 | 300 | 154 | 120 | 20.8 | 5.79 | 13.4 | 2.69* | 7.5 | 0.0000361 | 371520 | 251412 | 45% | 68% |
| | 105 | 306 | 152 | 123 | 20.6 | 5.96 | 5.5 | 6.56* | 18.2 | 0.0000361 | 152490 | 86689 | 16% | 24% |
| | 110 | 304 | 152 | 122 | 20.5 | 5.93 | 2.8 | 12.88* | 35.7 | 0.0000361 | 77631 | 41261 | 7% | 11% |
| | 115 | 306 | 152 | 123 | 20.6 | 5.95 | 1.5 | 24.05* | 66.7 | 0.0000361 | 41588 | 21364 | 4% | 6% |
| Comparative Example 2 | 85 | 98 | 38 | 33 | 4.3 | 7.66 | 35.8 | 1.21 | 2.8 | 0.0000433 | 826446 | 812861 | 100% | |
| | 95 | 99 | 38 | 36 | 4.7 | 7.75 | 29 | 1.37 | 3.4 | 0.0000397 | 729927 | 649935 | 80% | 100% |
| | 105 | 100 | 38 | 37 | 4.7 | 7.77 | 20.2 | 1.94 | 5.0 | 0.0000392 | 515464 | 396837 | 49% | 61% |
| | 110 | 99 | 39 | 35 | 4.6 | 7.49 | 13 | 3.19* | 7.7 | 0.0000415 | 313072 | 210144 | 26% | 32% |
| | 115 | 101 | 41 | 35 | 4.8 | 7.35 | 10.2 | 4.07* | 9.8 | 0.0000415 | 245641 | 155461 | 19% | 24% |
| Inventive Example 3 | 85 | 358 | 152 | 124 | 17.7 | 7.00 | 29.3 | 1.43 | 3.4 | 0.0000419 | 699301 | 625539 | 100% | |
| | 95 | 360 | 152 | 123 | 17.5 | 7.02 | 21.8 | 1.95 | 4.6 | 0.0000425 | 512821 | 406041 | 65% | 100% |
| | 105 | 354 | 152 | 123 | 17.8 | 6.91 | 10.2 | 4.09* | 9.8 | 0.0000417 | 244537 | 154762 | 25% | 38% |
| | 110 | 357 | 151 | 124 | 17.7 | 7.03 | 2 | 20.86* | 50.0 | 0.0000417 | 47948 | 24959 | 4% | 6% |
| Inventive Example 4 | 85 | 459 | 204 | 174 | 26.1 | 6.66 | 21.7 | 1.76 | 4.6 | 0.0000382 | 568182 | 449097 | 100% | |
| | 95 | 468 | 204 | 182 | 26.7 | 6.80 | 16.6 | 2.25 | 6.0 | 0.0000374 | 444444 | 320244 | 71% | 100% |
| | 105 | 445 | 203 | 170 | 26.3 | 6.49 | 2.3 | 16.42* | 43.5 | 0.0000378 | 60893 | 31948 | 7% | 10% |
| Inventive Example 5 | 95 | 386 | 204 | 117 | 20.9 | 5.62 | 20.8 | 2.29 | 4.8 | 0.0000476 | 436681 | 339774 | | 100% |
| | 105 | 382 | 204 | 116 | 21.0 | 5.55 | 10 | 4.76* | 10.0 | 0.0000476 | 209943 | 132293 | | 39% |
| | 110 | 386 | 204 | 117 | 20.9 | 5.63 | 1.7 | 28.02* | 58.8 | 0.0000476 | 35690 | 18432 | | 5% |

The present invention may be embodied in other forms without departing from the spirit and the essential attributes thereof, and, accordingly, reference should be made to the appended claims, rather than to the foregoing specification, as indicating the scope of the invention.

We claim:

1. A method for polymerizing one or more ethylene-based polymers comprising the steps of:
selecting ethylene and optionally one or more alpha-olefin comonomers;
selecting one or more catalyst systems comprising one or more procatalysts comprising Ti, one or more cocatalysts comprising Al, and one or more self-limiting agents (SLA); wherein the ratio of SLA to Ti (SLA:Ti) is from 5:1 to 40:1 and the ratio of Al to SLA (Al:SLA) is from 2:1 to 40:1;
polymerizing said ethylene and optionally one or more alpha-olefin comonomers in the presence of said one or more catalyst systems via a slurry polymerization process or gas-phase polymerization process in one or more reactors;

thereby producing one or more ethylene-based polymers;
wherein said catalyst system has a loss of least 85 percent of catalyst productivity when the temperature is increased from 85 to 115° C.

2. A method for polymerizing one or more ethylene-based polymers comprising the steps of:
selecting ethylene and optionally one or more alpha-olefin comonomers;
selecting one or more catalyst systems comprising one or more procatalysts comprising Ti, one or more cocatalysts comprising Al, and one or more self-limiting agents (SLA); wherein the ratio of SLA to Ti (SLA:Ti) is from 15:1 to 40:1 and the ratio of Al to SLA (Al:SLA) is from 5:1 to 20:1;
polymerizing said ethylene and optionally one or more alpha-olefin comonomers in the presence of said one or more catalyst systems via a slurry polymerization process or gas-phase polymerization process in one or more reactors;
thereby producing one or more ethylene-based polymers;
wherein said catalyst system has a loss of at least 80 percent of catalyst productivity when the temperature is increased from 95 to 110° C.

3. The method according to claim 1, wherein said SLA is selected from isopropyl laurate, isopropyl myristate, isopropyl palmitate, or isopropyl stearate.

4. The method according to claim 2, wherein said SLA is selected from isopropyl laurate, isopropyl myristate, isopropyl palmitate, or isopropyl stearate.

* * * * *